J. FREUD.
FOCUSING HOOD FOR CAMERAS.
APPLICATION FILED JUNE 22, 1914.
1,143,045.
Patented June 15, 1915.
2 SHEETS—SHEET 1.
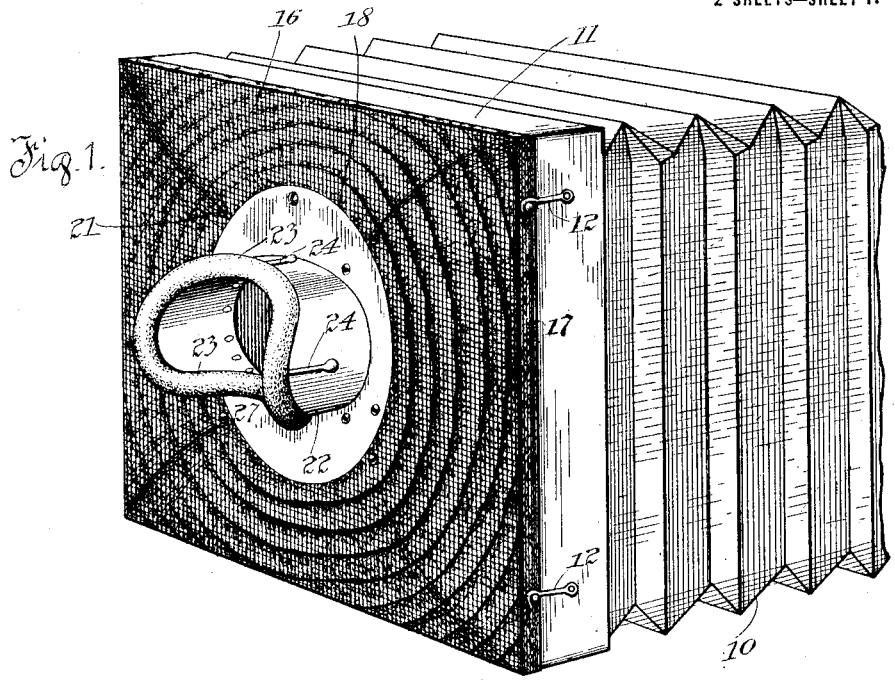
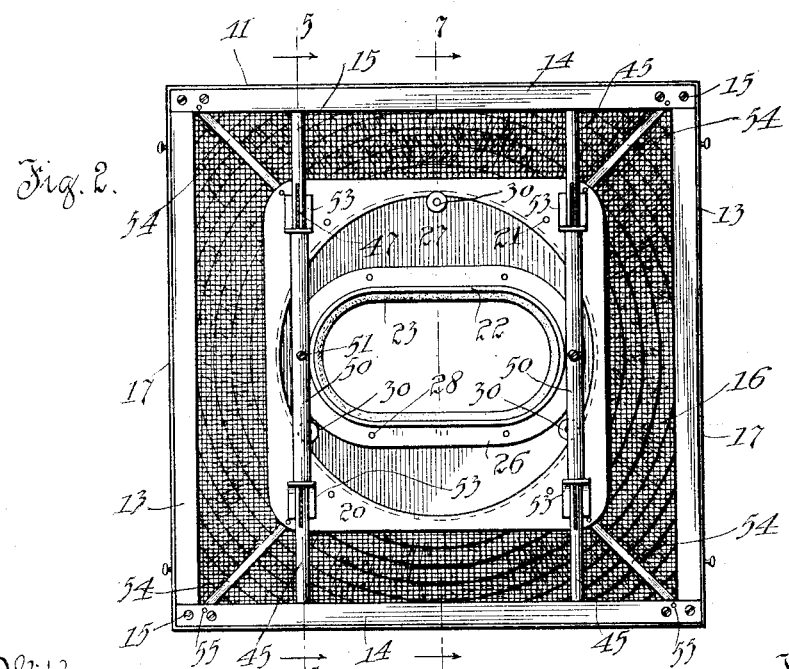

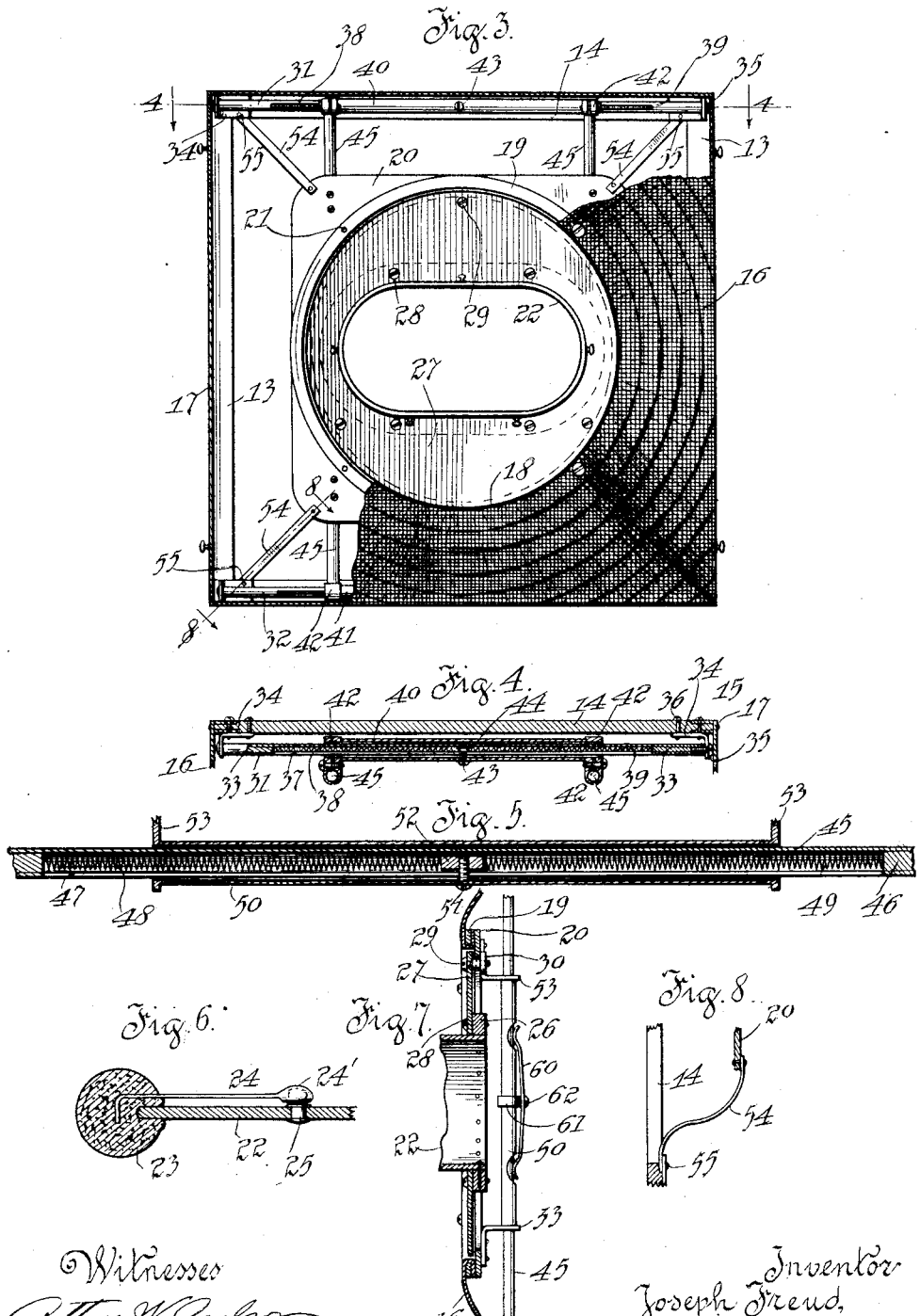

UNITED STATES PATENT OFFICE.

JOSEPH FREUD, OF CHICAGO, ILLINOIS.

FOCUSING-HOOD FOR CAMERAS.

1,143,045.  Specification of Letters Patent.  Patented June 15, 1915.

Application filed June 22, 1914. Serial No. 846,449.

*To all whom it may concern:*

Be it known that I, JOSEPH FREUD, a citizen of the United States, residing at Chicago, in the county of Cook and State of Illinois, have invented certain new and useful Improvements in Focusing-Hoods for Cameras, of which the following is a specification.

This invention relates to improvements in focusing hoods for cameras and more particularly to a universally movable eye piece for such hoods.

In focusing a camera in which the plates or film packs are removably carried in the rear of the box, it is customary for the operator to remove the plates or film holder, insert in place thereof a plate of ground glass and then place over his head a dark felt cloth or the like to prevent light from striking upon the rear face of the glass. He is thus able to view the image projected by the lens of the camera directly upon the ground glass exactly as it will appear from the plate when exposed. After obtaining the proper focus the film pack or plate holder is substituted for the ground glass and the exposure made.

One of the objects of my invention is to provide a compact, readily adjusted and easily attached focusing hood, eliminating the necessity of using an awkward, heavy cloth hood or cover.

Another object of my invention is to provide such a device in which an eye piece is normally positioned at the center of the hood but is universally movable to any portion of the field.

Still another object of my invention is to provide such an eye piece universally movable to any part of the field, which upon being released, automatically returns to a central position.

Other and further objects of my invention will be apparent to those skilled in the art, from a consideration of the following description and drawing, wherein—

Figure 1 is a perspective view of my improved eye piece showing it attached to a camera. Fig. 2 is a rear elevation of the eye piece and frame. Fig. 3 is a front elevation with parts broken away. Fig. 4 is a horizontal sectional view on the line 4—4 of Fig. 3. Fig. 5 is a vertical, fragmentary, sectional view on the line 5—5 of Fig. 2. Fig. 6 is an enlarged, fragmentary sectional view through the face shield and attaching means. Fig. 7 is an enlarged, fragmentary vertical, sectional view on the line 7—7 of Fig. 2, showing a modification, and Fig. 8 is a fragmentary sectional view on the line 8—8 of Fig. 3.

Referring to the drawings, the numeral 10 indicates a collapsible bellows, the front end of which is attached to a frame which may be either permanently or removably attached to the plate holder of a camera, the rear end being attached to a rectangular frame 11.

In the preferred form of my invention illustrated I have shown the frame 11 adapted to have clamped thereto a detachable hood, by means of the hooks 12.

The hood is carried by a rectangular frame, comprising the two pairs of parallel bars 13—14 secured at their corners by proper joints and screws 15. The hood 16 itself is made of some suitable fabric such as linen or the like, with its outer edges secured over the outer edges of the frame members 13—14 as at 17, and is formed into a plurality of circular plaits terminating in a central circular opening 18. The inner edge of the hood is turned under an annular ring 19 and secured in place by clamping the ring 19 against the plate 20 by means of the screws 21. The plate 20 is of rectangular outline with a circular opening at its center extending slightly within the inner periphery of the ring 19.

The ovate eye piece 22 carries at its outer curved edge, a protecting ring of sponge rubber 23 secured to the edge of the face mask by a plurality of spring fingers 24 secured at one end in the ring 23 and at the other end formed into heads 24', which spring over the nubs 25 secured in the outer surface of the eye piece. The inner edge of the eye piece 22 projects through a correspondingly shaped opening in the plate 27 and is secured to a ring 26 which in turn is attached to the rear face of the plate 27 by means of the screws 28. The ovate opening in the plate 27 through which the face mask 22 projects is of a size to conform exactly to the outlines of the mask so as to form a substantially tight fit and exclude light.

The plate 27 is circular in outline and is of a diameter slightly less than the inner diameter of the ring 19 and somewhat greater than the inner diameter of the plate 20. A plurality of pins 29 carrying rollers 30 at their inner ends extend through the plate 27 near its outer edge and are positioned so that the rollers 30 overlie the inner face of the plate 20 and provide a roller guide way in which the plate 27 is free to rotate.

Parts thus far described, comprising the eye piece, hood and frame, would in themselves be sufficient for performing to a limited extent the desired functions if the eye piece 22 could be made sufficiently large to permit inspection of the entire area of the ground glass plate with the line of sight at all times perpendicular to the surface of the ground glass. Obviously, however, the eye piece must be made of a size to conform to the face of the operator, and cannot therefore be made large enough to include within his vision the entire surface of the plate. It is because of the desirability particularly in large cameras, of viewing all parts of the plate with the line of sight perpendicular to the surface of the plate that I have made the hood in a plaited form so as to permit movement of the eye piece to various parts of the frame and the structure which I will now describe is for the purpose of normally holding the eye piece in the center of the hood and at the same time permitting the operator to move the same into any position within the confines of the frame.

A pair of horizontal tubes 31—32 plugged at their ends 33 are secured by means of the right angle clips 34 and screws 35—36 to the inner edges of the horizontal frame bars 14—14. These tubes are slotted out as at 37 in their forwardly extending sides and carry within their bores a pair of coil springs 38, 39 of equal length and resistance. Surrounding the tubes are two shorter tubes 40 and 41, to the ends of which are secured the clamps 42. At the center of each of the tubes 40 and 41 a hole is drilled, through which passes the screw 43 extending through the slots 37 and into the bores of the tubes 31 and 32 and carrying at their inner ends the plugs or stops 44. These stops 44 separate the two springs 38 and 39.

A pair of vertical tubes 45—45 plugged at their ends 46 are secured at their ends in the clamps 42. Each of the tubes are slotted at 47 and carry the two springs 48—49 of equal length and tension. Surrounding the tubes 45—45 are a pair of shorter tubes 50—50 carrying at their centers the screws 51 which extend through the slots 50 and have mounted on their inner ends the plugs 52, separating the springs 48 and 49. To the ends of the tubes 50 are secured right angle clips 53, the vertical legs of which are fastened to the corners of the plate 20.

Four springs 54 radiate from the four corners of the plate 20 and are fastened at their outer ends by means of the rivets 55 in the corners of the rectangular frame. These springs 54 are in the preferred form of my invention shaped in the form of an ogee curve, as illustrated in Fig. 8 and serve not only to extend the hood 16 but also as auxiliary springs for returning the eye piece to central position.

When the operator, for example, wishes to scrutinize upper left hand corner of the focusing plate the eye piece is moved upwardly upon the tubes 45 against the action of the springs and the tubes 40—41 are slid to the left upon the tubes 31—32 until the desired position is reached. On releasing the eye piece it instantly and automatically returns to its central position. Obviously the connection is a universal one and the mask can be moved to any portion of the hood desired.

In Fig. 7 I have shown a modification in which the vertical springs may be removed from their tubes 45 and a frictional device used for holding the eye piece in any desired vertical position. For performing this function I have attached a ring 61 around the center of each of the guide tubes 50 and secured thereto a leaf spring 60 by means of the screw 62. The spring 60 extends parallel to the tube and at its ends makes frictional contact with the tube 45 through openings cut in tube 50.

Whereas in the specification and drawings I have described and illustrated a preferred embodiment of my invention, with a slight modification, it is evident that various structural changes may be made without departing from the spirit or scope thereof.

Having described my invention, what I claim is:—

1. In a camera focusing hood, the combination of a frame, a flexible hood secured at its outer edges to the frame and terminating at its center in an aperture, an eye piece secured within the aperture and resilient means to permit lateral universal movement and to automatically return said eye piece to the center of the hood comprising opposed springs unaffected when the eye piece is moved in a vertical plane and other opposed springs unaffected when the eye piece is moved in a horizontal plane.

2. In a camera focusing hood, the combination of a frame, a flexible hood secured at its outer edges to the frame and terminating at its center in an aperture, an eye piece secured within the aperture and resilient means carried by the frame and secured to the eye piece for yieldingly holding said eye piece at the center of the hood, said resilient means comprising opposed springs operable when the eye piece is moved in a vertical plane and other opposed springs operable when the eye piece is moved in a horizontal plane, all of said springs being operable when said eye piece is moved in any other transverse plane.

3. In a camera focusing hood, the combination of a frame, a flexible hood secured at its outer edges to the frame and terminating at its center in an aperture, an eye piece secured within the aperture and resilient means comprising pairs of opposing vertical springs and pairs of opposing horizontal springs for normally holding said eye piece at the center of the hood.

4. In a camera focusing hood, the combination of a frame, a flexible hood secured at its outer edges to the frame and terminating at its center in an aperture, an eye piece secured within the aperture and resilient means comprising four curved leaf springs secured to the frame and extending radially inward to the eye piece normally holding said eye piece at the center of the frame and distending said hood.

5. In a camera focusing hood, the combination of a rectangular frame, a flexible hood, secured at its outer edges to the frame and terminating at its center in an aperture, an eye piece secured within the aperture, horizontal tubes connected to said frame, a pair of opposing coil springs within each tube, a pair of tubes slidable over the first and having legs projecting through slots in the first mentioned tubes and positioned between the opposing springs, a pair of vertical tubes secured to the ends of the second mentioned tubes, a pair of opposing coil springs within each of the vertical tubes, tubes slidable over the vertical tubes and having lugs projecting through slots in the vertical tubes and positioned between the opposing coil springs, and means for connecting the last mentioned tubes to the eye piece.

In testimony whereof I hereunto set my hand in the presence of two subscribing witnesses.

JOSEPH FREUD.

In the presence of—
STANLEY W. COOK,
MARY F. ALLEN.

Copies of this patent may be obtained for five cents each, by addressing the "Commissioner of Patents, Washington, D. C."